United States Patent
Lohmiller et al.

(10) Patent No.: US 12,351,925 B2
(45) Date of Patent: Jul. 8, 2025

(54) ELECTROLYZER SYSTEM AND MATRIX CELL THEREFOR

(71) Applicant: Airbus Defence and Space GmbH, Taufkirchen (DE)

(72) Inventors: Winfried Lohmiller, Taufkirchen (DE); Walter Jehle, Taufkirchen (DE); Thomas Eck, Neustadt (DE); Fabian Fremdling, Friedrichshafen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 478 days.

(21) Appl. No.: 17/835,571

(22) Filed: Jun. 8, 2022

(65) Prior Publication Data

US 2022/0396891 A1    Dec. 15, 2022

(30) Foreign Application Priority Data

Jun. 11, 2021 (DE) .......................... 102021115164.3

(51) Int. Cl.
*C25B 9/60* (2021.01)
*B01D 53/22* (2006.01)
(Continued)

(52) U.S. Cl.
CPC ................ *C25B 9/60* (2021.01); *B01D 61/46* (2013.01); *C25B 1/04* (2013.01); *C25B 9/21* (2021.01);
(Continued)

(58) Field of Classification Search
CPC .... C25B 1/04; C25B 9/19; C25B 9/21; C25B 9/23; C25B 15/08; C25B 15/083;
(Continued)

(56) References Cited

U.S. PATENT DOCUMENTS 5,718,819 A    2/1998  Peschka et al.
5,843,297 A *  12/1998 Schmid .................. C25B 15/08
                                                204/266

(Continued)

FOREIGN PATENT DOCUMENTS

DE    10306342 A1    8/2004
WO    2020160424 A1  8/2020

OTHER PUBLICATIONS

Brussieux et al. "Controlled electrochemical gas bubble release from electrodes entirely and partially covered with hydrophobic materials." Electrochimica Acta 56 (2011) 7194-7201 (Year: 2011).*

(Continued)

*Primary Examiner* — Luan V Van
*Assistant Examiner* — Alexander R. Parent
(74) *Attorney, Agent, or Firm* — Greer, Burns & Crain, Ltd.

(57) ABSTRACT

Matrix cells are used to improve the regeneration capacity of an electrolyzer system. The electrolyte is electrolyzed in the matrix cell. Gas (predominantly product gas) which has unwantedly accessed the electrolyte space is transported off from the electrolyte space into the gas space envisioned therefor by a degassing device. Additional measures such as ultrasonic transducers and field electrodes may realize electrolyte flow and improved transporting-off of gas.

17 Claims, 6 Drawing Sheets

(51) Int. Cl.
  *B01D 61/46*    (2006.01)
  *C25B 1/04*     (2021.01)
  *C25B 9/21*     (2021.01)
  *C25B 9/23*     (2021.01)
  *C25B 11/031*   (2021.01)
  *C25B 15/02*    (2021.01)
  *C25B 15/08*    (2006.01)

(52) U.S. Cl.
  CPC .............. *C25B 15/02* (2013.01); *C25B 15/08* (2013.01); *C25B 15/083* (2021.01); *B01D 2053/221* (2013.01); *B01D 2256/12* (2013.01); *B01D 2256/16* (2013.01); *B01D 2257/104* (2013.01); *B01D 2257/108* (2013.01); *B01D 2325/36* (2013.01); *C25B 9/23* (2021.01); *C25B 11/031* (2021.01)

(58) Field of Classification Search
  CPC .......... B01D 2053/221; B01D 2256/12; B01D 2256/16; B01D 2257/104; B01D 2257/108
  USPC ........................................................ 204/266
  See application file for complete search history.

(56) References Cited

U.S. PATENT DOCUMENTS

| | | | |
|---|---|---|---|
| 7,045,042 B2* | 5/2006 | O'Brien | C25B 15/00 204/266 |
| 11,005,117 B2* | 5/2021 | Seymour | C25B 9/77 |
| 2011/0048961 A1 | 3/2011 | Smedley | |
| 2016/0276697 A1 | 9/2016 | Esswein et al. | |

OTHER PUBLICATIONS

Stranger et al. "The prospects of developing a highly energy efficient water electrolyser by eliminating or mitigating bubble effects." Sustainable Energy Fuels, 2021, 5, 1280 (Year: 2021).*
German Office Action dated Feb. 11, 2022; priority document.
Extended European Search Report from corresponding European application No. 22177776.6 dated Jan. 3, 2023.

* cited by examiner

ELECTROLYZER SYSTEM AND MATRIX CELL THEREFOR

CROSS-REFERENCES TO RELATED APPLICATIONS

This application claims the benefit of the German patent application No. 102021115164.3 filed on Jun. 11, 2021, the entire disclosures of which are incorporated herein by way of reference.

FIELD OF THE INVENTION

The invention relates to a matrix cell for an electrolyzer system. Additionally, the invention relates to an electrolyzer system.

BACKGROUND OF THE INVENTION

Separation of product gas for alkaline and PEM electrolyzers is carried out typically in an external gas separation system. In that case there is no dedicated region for feed water, and so the water space or electrolyte space is the gas space too. For effective separation of the large quantity of product gas, circulation is sensible, and is utilized simultaneously to the cooling. The relatively high volume flows by comparison with the supply of feed water additionally ensure the effective mixing of the electrolyte.

DE 103 06 342 A1 discloses an electrolysis device which has at least one electrolysis cell with a power connection, at least one electrolyte supply and two gas outputs, and a housing with a power feedthrough and two gas outlets. The electrolysis cell is arranged in the housing. One of the gas outputs is connected to one of the gas outlets, the other gas output is located inside the housing and the at least one electrolyte supply starts inside the housing, so that the housing serves as both electrolyte storage and gas storage.

SUMMARY OF THE INVENTION

It is an object of the invention to improve electrolyzer systems, especially in terms of their regeneration capacity.

The invention provides a matrix cell adapted for an electrolyzer system for electrolyzing an aqueous electrolyte, wherein the matrix cell comprises an electrolyte space for accommodating the electrolyte; a cathode electrode and an anode electrode; a cathodic gas space, disposed adjacent to the electrolyte space and separated therefrom by a gastight first membrane, the cathodic gas space and the cathode electrode being configured in such a way that energizing of the cathode electrode allows a cathodic product gas to be generated at an interface of the cathode electrode with the first membrane in such a way that it is flowable into the cathodic gas space; an anodic gas space, disposed adjacent to the electrolyte space and separated therefrom by a gastight second membrane, the anodic gas space and the anode electrode being configured in such a way that energizing of the anode electrode allows anodic product gas to be generated at an interface of the anode electrode with the second membrane in such a way that it is flowable into the anodic gas space; and a, preferably electrolyte-tight, degassing device, which is designed to allow selective emergence of product gas located in the electrolyte space into at least one of the gas spaces.

It is preferred that the degassing device and preferably the additional components thereof is/are configured for continuous and/or discontinuous operation of the matrix cell, more particularly degassing operation for degassing the electrolyte space. It is preferred that at least one membrane is designed as a degassing membrane.

It is preferred that the degassing device is designed to allow selective emergence of cathodic product gas, located in the electrolyte space, into the cathodic gas space.

It is preferred that the degassing device is disposed in a degassing aperture formed in at least one membrane, in order to provide selective passage for the product gas from the electrolyte space into at least one of the gas spaces.

It is preferred that the degassing device is disposed in a degassing aperture, formed in the first membrane, in order to provide selective passage for the cathodic product gas from the electrolyte space into the cathodic gas space.

It is preferred that the degassing device is designed to allow emergence of cathodic product gas, located in the electrolyte space, into the cathodic gas space.

It is preferred that the degassing device has a selective degassing membrane which is designed selectively to let through predominantly the cathodic or the anodic product gas.

It is preferred that the degassing device comprises at least one degassing membrane layer structure which has a hydrophilic or hydrophobic degassing membrane.

It is preferred that the degassing device comprises a degassing membrane layer structure which comprises a hydrophobic degassing membrane and a hydrophilic degassing membrane, the hydrophobic degassing membrane being disposed between the hydrophilic degassing membrane and the electrolyte space in such a way that the hydrophobic degassing membrane in the operating state comes into contact with the electrolyte.

It is preferred that the hydrophilic degassing membrane is disposed in contact with the membrane in such a way that the hydrophilic degassing membrane is wettable with the electrolyte exclusively via the membrane.

It is preferred that the degassing device is designed to be brought or switched into a state in which gas bubbles can be generated in a hydrophilic degassing membrane.

It is preferred that the hydrophilic degassing membrane can be subjected to an electrical potential in such a way that the gas bubbles can be generated in the hydrophilic degassing membrane.

It is preferred that the hydrophilic degassing membrane can be put into electrically conducting communication with the cathode electrode and/or the anode electrode via a switch.

It is preferred that at least one degassing membrane is a porous membrane which is designed to transport product gas by means of pores.

It is preferred that at least one degassing membrane is a solution-diffusion membrane which is designed to transport product gas dissolved in the membrane by means of diffusion.

It is preferred that at least one degassing membrane is a functional membrane which has a poreless, water- and/or ion-conducting design.

It is preferred that at least one degassing membrane, preferably the hydrophilic degassing membrane, has a lower bubble point pressure, which when exceeded results in gas being flowable through the degassing membrane, than the membrane.

It is preferred that the degassing device contains a valve which can be regulated and/or controlled actively or automatically.

The matrix cell preferably further comprises an ultrasound generation device which is designed to generate ultrasound waves in the matrix cell, preferably in the electrolyte space.

It is preferred that the ultrasound generation device has at least one piezoelectric sound generator integrated into the matrix cell.

It is preferred that the ultrasound device is electrically connected in such a way that it can be excited by an alternating voltage imposed on the operating voltage.

The matrix cell preferably further comprises a field generation device which is designed to generate an electrical field and/or a magnetic field configured such that a flow of the electrolyte in the electrolyte space in fluid flow direction can be generated.

The invention provides an electrolyzer system designed for electrolyzing an aqueous electrolyte, wherein the electrolyzer system comprises an electrolyzer device having at least one matrix cell which has an electrolyte space, a cathodic gas space, and an anodic gas space, and comprises at least one of the following features:
 a) at least one separation device which is in fluid communication with the electrolyte space and at least one of the gas spaces and a product gas exit and is designed to let gas through from a liquid side to a gas side; and/or
 b) at least one pump device which is designed to convey the electrolyte in a circuit extending through the matrix cell.

It is preferred that the matrix cell is an above-described preferred matrix cell.

The invention provides an electrolyzer system designed for electrolyzing an aqueous electrolyte, wherein the electrolyzer system comprises an electrolyzer device having at least one preferred matrix cell.

Preferably, the matrix cell comprises an electrolyte space for accommodating the electrolyte. Preferably, the matrix cell comprises a cathode electrode and an anode electrode.

Preferably, the matrix cell comprises a cathodic gas space, disposed adjacent to the electrolyte space and separated therefrom by a gastight first membrane.

Preferably, the cathodic gas space and the cathode electrode are configured in such a way that energizing of the cathode electrode allows a cathodic product gas to be generated at an interface of the cathode electrode with the first membrane in such a way that it is flowable into the cathodic gas space.

Preferably, the matrix cell comprises an anodic gas space, disposed adjacent to the electrolyte space and separated therefrom by a gastight second membrane.

Preferably, the anodic gas space and the anode electrode are configured in such a way that energizing of the anode electrode allows anodic product gas to be generated at an interface of the anode electrode with the second membrane in such a way that it is flowable into the anodic gas space. Preferably, the matrix cell comprises a, preferably electrolyte-tight, degassing device, which is designed to allow selective emergence of product gas located in the electrolyte space into at least one of the gas spaces.

The electrolyzer system further comprises at least one pressure regulation device, which is connected in fluid flux direction between one of the gas spaces and the separation device, wherein the pressure regulation device is designed to limit the fluid flux from the gas space to the separation device in such a way that a lower gas pressure prevails on the gas side.

It is preferred that the separation device comprises a cathodic gas separator which on its gas side is in fluid communication with the cathodic gas space and also with a cathodic product gas exit and on its liquid side is in fluid communication with the electrolyte space.

It is preferred that the cathodic gas separator has a separation membrane which is designed to let cathodic product gas through from the liquid side to the gas side.

It is preferred that the separation device comprises an anodic gas separator which on its gas side is in fluid communication with the anodic gas space and also with an anodic product gas exit and on its liquid side is in fluidic communication with the liquid side of the cathodic gas separator.

It is preferred that the pump device is in fluid communication with the separation device and with the electrolyte space in order to convey the electrolyte through the matrix cell in the circuit.

It is preferred that the pump device is in fluid communication with the liquid side of the cathodic gas separator and/or with the liquid side of the anodic gas separator.

It is preferred that the pump device is designed to convey the electrolyte by means of generation of a gas bubble.

It is preferred that the pump device comprises a capillary region which has an expanding design in fluid flow direction in order to drive a gas bubble in fluid flow direction, there being disposed, bordering the capillary region, a pump electrode which can be subjected to electrical potential in such a way that a gas bubble can be generated from the electrolyte in the capillary region.

It is preferred that the capillary region is disposed in fluid flow direction between the electrolyzer device and the separation device and is in fluid communication with these devices.

It is preferred that the electrolyzer system in the operationally ready state contains the aqueous electrolyte.

It is preferred that the electrolyte contains a devolatilizing additive which is designed to promote the coalescence of small gas bubbles into a larger gas bubble.

It is preferred that the electrolyte contains a viscosity-modifying additive which is designed to change the viscosity of the electrolyte in comparison to the viscosity of the electrolyte without such additive.

It is preferred that the electrolyte contains a defoaming additive which is designed to reduce the probability of the development of liquid interfaces, in order to facilitate gas transport.

It is preferred that the electrolyte contains a magnetorheological additive which is designed to heighten the interaction between the electrolyte and a magnetic field.

It is preferred that the electrolyte contains an electrorheological additive which is designed to heighten the interaction between the electrolyte and an electrical field.

It is preferred that the electrolyte contains a ferrofluid.

It is preferred that the electrolyte contains a metal which is designed together with hydrogen to form a metal hydride for the temporary storage of the hydrogen.

It is preferred that the electrolyte contains a liquid organic hydrogen carrier (LOHC) system for the temporary storage of the hydrogen.

The electrolyzer is based on matrix cells, in other words on a substantially fixed electrolyte. In these systems, water space and gas space are separate from one another, and so there is no need either for gas separation or for circulation. The intention here is to reduce the risk of inhomogenization of the electrolyte concentration or of gas accumulation and/or entrenched gas bubbles in channels and structures. They may be determined, for example, by gas diffusion with corresponding temperature gradients (solubility limit) or extraneous electrolysis, with extraneous electrolysis referring to an electrolysis which takes place in a region not intended therefor. The cause is usually unavoidable differences in potential at parts having electrolyte contact.

One idea is to carry out gas separation. As the concept is defined by a dry gas space, it requires retention of the feed water or electrolyte in conjunction with (virtually) complete filling of the water space or electrolyte space, respectively. Degassing takes place at a gas accumulation pressure above that of a product gas (for example, H2). At the same time, however, this means that water can be conveyed into the gas space as a result of the hydrostatic pressure, depending on type of membrane, in the lower region. From this it is possible to derive various approaches, which may also be combined with one another, and return to a particular product gas is not intended in any way.

With a hydrophobic membrane, for example, continuous degassing is possible, whereas the water-repelling property provides more effective protection from overfilling of the gas space. Depending on the installation position, an excess pressure of water may be necessary in order for product gases not to be drawn into the water space. It is necessary, though, to bear in mind that the excess pressure does not automatically lead to filling of the gas space, since this may be counteracted by higher current strengths and by the flow resistance of the membrane. Nevertheless it is a possibility for degassing in accordance with the invention.

A hydrophilic membrane may prevent gas flow after wetting with a liquid. This enables a pressure of the electrolyte space that is greatly below that of the gas space Filling of the water space with product gases is therefore ruled out almost entirely, while overfilling with electrolyte remains avoidable in spite of good electrolyte distribution. Degassing may require targeted opening of the membrane. This may take place operationally as a result of exceedance of the bubble pressure, or by removal of the water from the membrane structure in other ways, including the possibility of electrochemical removal.

The membrane may be a silver membrane. It is located in the electrical field between the electrodes with the potentials φ½. Because of influence, the potential of the membrane φ3 is determined by the distances a and b from the electrode (for example, anode).

$$\frac{\varphi_2 - \varphi_1}{\varphi_3 - \varphi_1} = \frac{a}{b} = \frac{U_{cell}}{U_{membrane}}$$

$$U_{membrane} = \frac{b}{a} \cdot U_{cell}$$

If the voltage between membrane and one electrode exceeds the decomposition voltage, electrolysis takes place in the interior of the membrane. The resulting gas bubbles are able to force out the electrolyte and so open the membrane. The design may be chosen accordingly in order to utilize this as a safety function in the event of high cell voltages. Alternatively, a sufficient potential difference may be forcibly brought about, with for example—but not only—a short circuit with the counterelectrode (for example, cathode).

The composition of the gas accumulations is determined only by the electrolyte. Generally, therefore, it comprises hydrogen and oxygen. Especially when there is a requirement for high gas purity, but also for safety reasons, a targeted gas return may be sensible. In this case the membranes involved may be porous membranes or solution-diffusion membranes or else functional membranes. While the functional membrane has no pores, it nevertheless has a water- and ion-conducting design. A critical factor, for example, is the selectivity for hydrogen relative to oxygen.

The properties may be influenced further still by combining different types of membrane. The desire is for gas to be transported off from the water side to the gas side, while conversely this transport is to be prevented. This property may be achieved through a multilayer construction of hydrophilic and hydrophobic membrane. A hydrophilic side is supplied with water/electrolyte on the gas side via capillary effects, and so forms a gas-impervious film on the hydrophobic membrane, while in the opposite direction the gas is able to pass through owing to a low bubble pressure on the hydrophilic side.

The solution-diffusion mechanism is based on the partial pressures and not the total pressures. For this reason, this type of membrane has no influence on the regulation of the water balance. It should be borne in mind, however, that the necessary difference in partial pressure for transport exists of course only in relation to another gas, in other words, for example, hydrogen in oxygen. In order to minimize gas contamination nevertheless, a recombination catalyst is advisable.

Gas conveying or degassing may be promoted by further measures.

The degassing may be carried out not only internally but also externally. As a result, a new pressure level may be provided on the gas side, which eliminates restrictions in the required pressure settings in the cell. The gas pressure is lowered, for example, with a metering valve upstream of the membrane, with the pressure gradient thereby facilitating degassing. On the right, separation on both process gas sides is envisaged. Here, a hydrogen-selective membrane concentrates the oxygen, which is separated in a hydrophobic membrane connected in series. This system does not, in fact, generally require a forced traversing flow, although such a flow may be beneficial for gas bubble transport. Moreover, all aforementioned membranes and combinations thereof may be used.

A hindrance, particularly in the case of external degassing is the entrenchment of bubbles in narrow channels. One solution is the pumped circulation for the separation of process gas. Since the gas production in question here is only in the parts-per-thousand range by comparison with the process gas, the leakage currents critically caused by the gas accumulations can be utilized for pumping. This makes use of the influence of the capillary effect on the movement of a bubble in an expanding capillary. The gas bubble may also be generated in a targeted way within the channel, with an electrochemically active surface. The rate can also be adjusted by the potential of the surface relative to the cells.

Within the water supply layer, matrix cells primarily possess a structure which serves to fix the electrolyte. Bubbles in this region are a hindrance, since they usually cannot be driven out by pumping. It is useful in this case to use specific devolatilizing additives, which promote the coalescence of a plurality of relatively small air bubbles to a large bubble and hence promote ascendance to the surface. In addition to devolatilizers, it is also possible to consider using viscosity-lowering additives or defoamers.

Ultrasound may act similarly to devolatilizers. Gas bubbles are able to coalesce and can then be transported off more easily, and the ultrasound additionally is able to act on other gases in solution as well and to contribute to a homogenization of concentration in the electrolyte. It is difficult to penetrate an entire stack with ultrasound, since the powers required are very high. Appropriate ultrasonic transmitters, primarily piezoceramics, may be integrated directly into the water supply layer of each cell, allowing a reduction in the power required for penetrating the entire stack. The electrical connection may be, but need not be, made via the potential of the electrodes. Superimposing the supply current with the resonant frequency of the transducer may serve for activating the ultrasound.

In an electrolysis cell, the ions of the electrolyte move because of an electrical field. In this context the requirement is usually at the same time for high currents which additionally form a magnetic field. With magneto-electrochemistry it is possible to explain the development of a convection of ions parallel to the electrode surface on the basis of the magnetic field. Both effects (electrical and magnetic) may be utilized in a targeted way in order to bring about a flow within the water space of a matrix cell. As well as the transport of gas bubbles, a primary purpose of this is to support the diffusion for homogenization of the electrolyte. It would be possible, for example, to incorporate alternating fields into the water supply layer by means of electrical conductors, or to exert a substantial influence over the effect by addition of additives. There is a distinction to be made between magnetorheological and electrorheological fluids and ferrofluids.

As already remarked, the generation of unwanted gas bubbles is typically very small by comparison with the amount of product gas. Particularly in the case of pressure electrolysis and in the case of cyclical operation, temporary storage with regeneration may be appropriate. It is possible, for example, to incorporate metal hydrides or LOHCs as well into the space of the electrolyte.

BRIEF DESCRIPTION OF THE DRAWINGS

Exemplary embodiments are elucidated in more detail below with reference to the appended schematic drawings, in which.

DETAILED DESCRIPTION OF THE PREFERRED EMBODIMENTS

Figure 1:
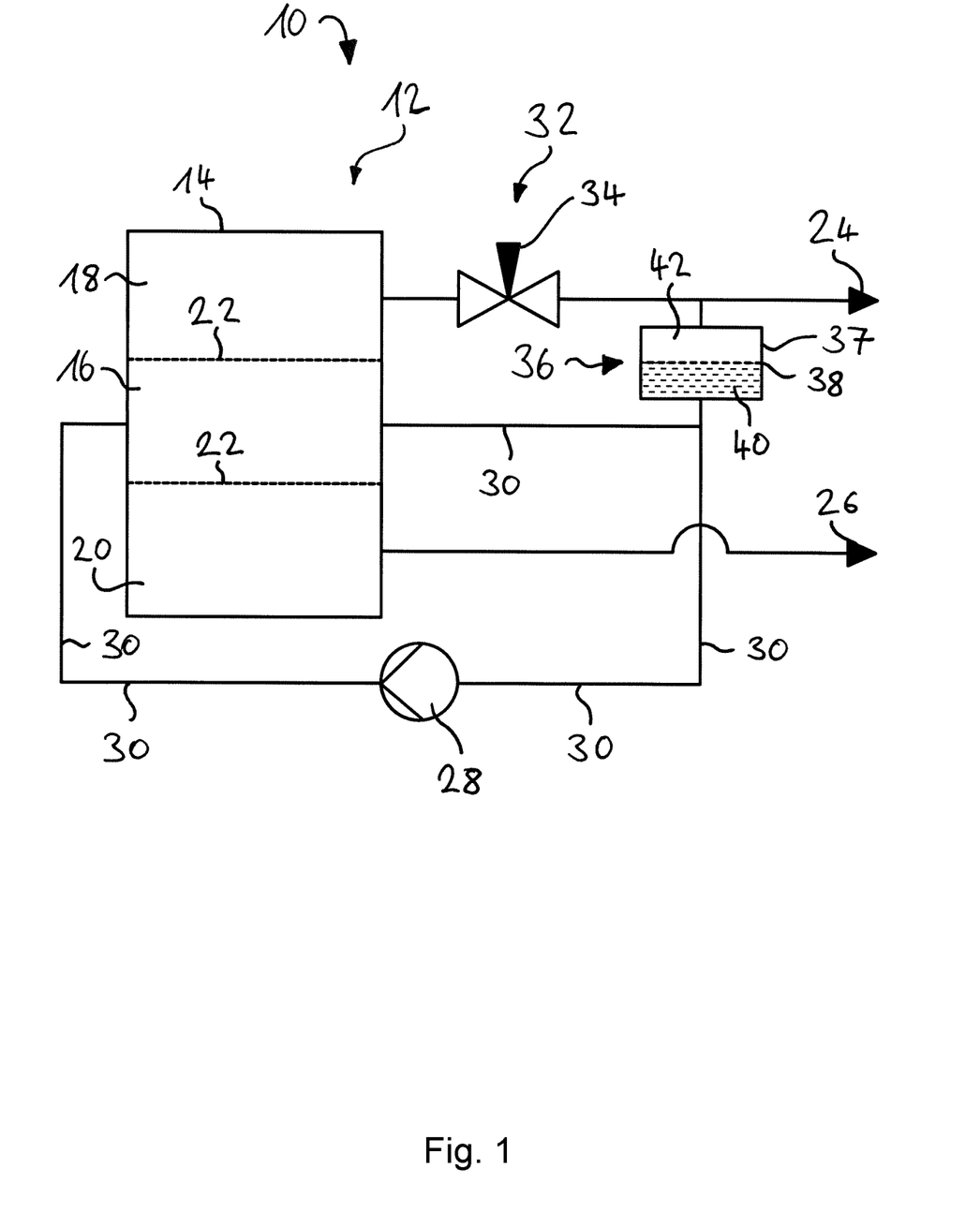
FIG. 1 shows an exemplary embodiment of an electrolyzer system.

Reference is made below to FIG. 1, which shows an example of an electrolyzer system 10. The electrolyzer system 10 comprises an electrolyzer device 12. The electrolyzer device 12 comprises a plurality of matrix cells 14. Each matrix cell 14 has an electrolyte space 16, a cathodic gas space 18, and an anodic gas space 20. The electrolyte space 16 is separated from the gas spaces 18 and 20 by respective membranes 22. The membrane 22 is configured to let gas located or formed in the electrolyte space 16 through into the gas spaces 18 and 20. At the same time the membrane 22 separates the gases from one another including gas located or formed in the electrolyte space 16 relative to the gas spaces 18 and 20.

The electrolyzer system 10 comprises a cathodic product gas exit 24 and an anodic product gas exit 26. At the product gas exits 24 and 26 the respective gas may be withdrawn and stored, for example, in a gas cylinder, not represented in more detail here. The electrolyzer system 10 comprises a pump device 28. The pump device 28 is configured to convey the electrolyte in an electrolyte circuit 30 which contains the electrolyte space 16.

The electrolyzer system 10 comprises a pressure regulation device 32. The pressure regulation device 32 is configured to adjust the gas flow escaping from the gas spaces 18 and 20. The pressure regulation device 32 comprises a metering valve 34, which is disposed between the cathodic gas space 18 and the cathodic product gas exit 24 and is in fluid communication with each of the space and the exit.

The electrolyzer system 10 comprises a separation device 36. The separation device 36 comprises a cathodic gas separator 37 with a separation membrane 38. The separation membrane 38 separates the liquid side 40 from the gas side 42. The separation membrane 38 is configured such that gas located on the liquid side 40 is transported through the separation membrane 38 to the gas side 42.

The functioning of the electrolyzer system 10 is elucidated in more detail below.

In the matrix cell 14, the electrolyzer device 12 electrolyzes the water in the aqueous electrolyte into cathodic product gas (here: hydrogen) and anodic product gas (here: oxygen). The cathodic product gas flows from the cathodic gas space 18 through the metering valve 34 to the cathodic product gas exit 24. However, the gas pressure of the cathodic product gas is reduced because of the metering valve 34 downstream.

The electrolyte which is conveyed in the electrolyte circuit 30 by means of the pump device 28 may additionally contain unwanted cathodic product gas. This gas flows along the electrolyte circuit 30 into the cathodic gas separator 37 of the separation device 36. Because of the lower gas pressure of the cathodic product gas on the gas side 42, any remaining cathodic product gas is transported through the separation membrane 38 to the gas side 42 and, therefore, likewise reaches the cathodic product gas exit 24.

The anodic product gas is guided directly from the anodic gas space 20 to the anodic product gas exit 26.

Figure 2:
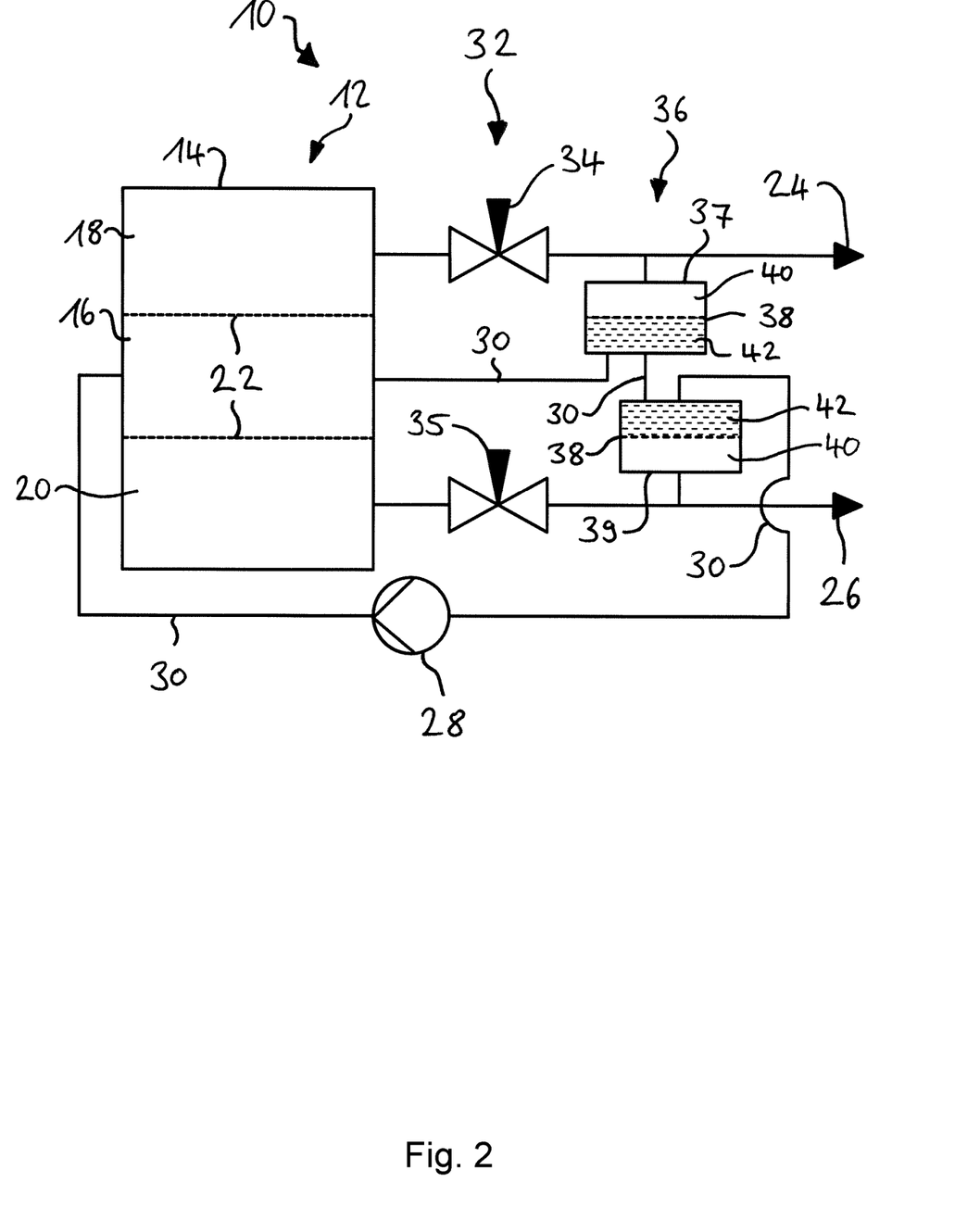
FIG. 2 shows a further exemplary embodiment of an electrolyzer system.

A further exemplary embodiment of the electrolyzer system 10 is elucidated in more detail with reference to FIG. 2. The electrolyzer system 10 is elucidated only insofar as it differs from the exemplary embodiment hitherto described.

As represented in FIG. 2, the pressure regulation device 32 comprises a further metering valve 35. The further metering valve 35 is disposed between the anodic gas space 20 and the anodic product gas exit 26 and is in fluid communication with the space and the exit. The further metering valve 35 functions substantially like the metering valve 34.

As further represented in FIG. 2, the separation device 36 additionally comprises an anodic gas separator 39. The anodic gas separator 39 is configured similarly to the cathodic gas separator 37, with the proviso that the separation membrane 38 of the anodic gas separator 39 is configured to transport the anodic product gas to its gas side 42.

The functioning of this electrolyzer system 10 is elucidated in more detail briefly below. As before, the electrolyte is electrolyzed in the matrix cell 14. In the cathodic gas separator 37, unwanted cathodic product gas is transported from the electrolyte to the gas side 42 and to the cathodic product gas exit 24. This further heightens the relative concentration of anodic product gas in the electrolyte. By means of the anodic gas separator 39, the concentrated anodic product gas is transported through the separation membrane 38 of the separator to its gas side 42 and to the anodic product gas exit 26. Here as well, the further metering valve 35 lowers the pressure of the anodic product gas on the gas side 42, and so anodic product gas is able more easily to escape through the separation membrane 38 of the anodic gas separator 39.

Figure 3:
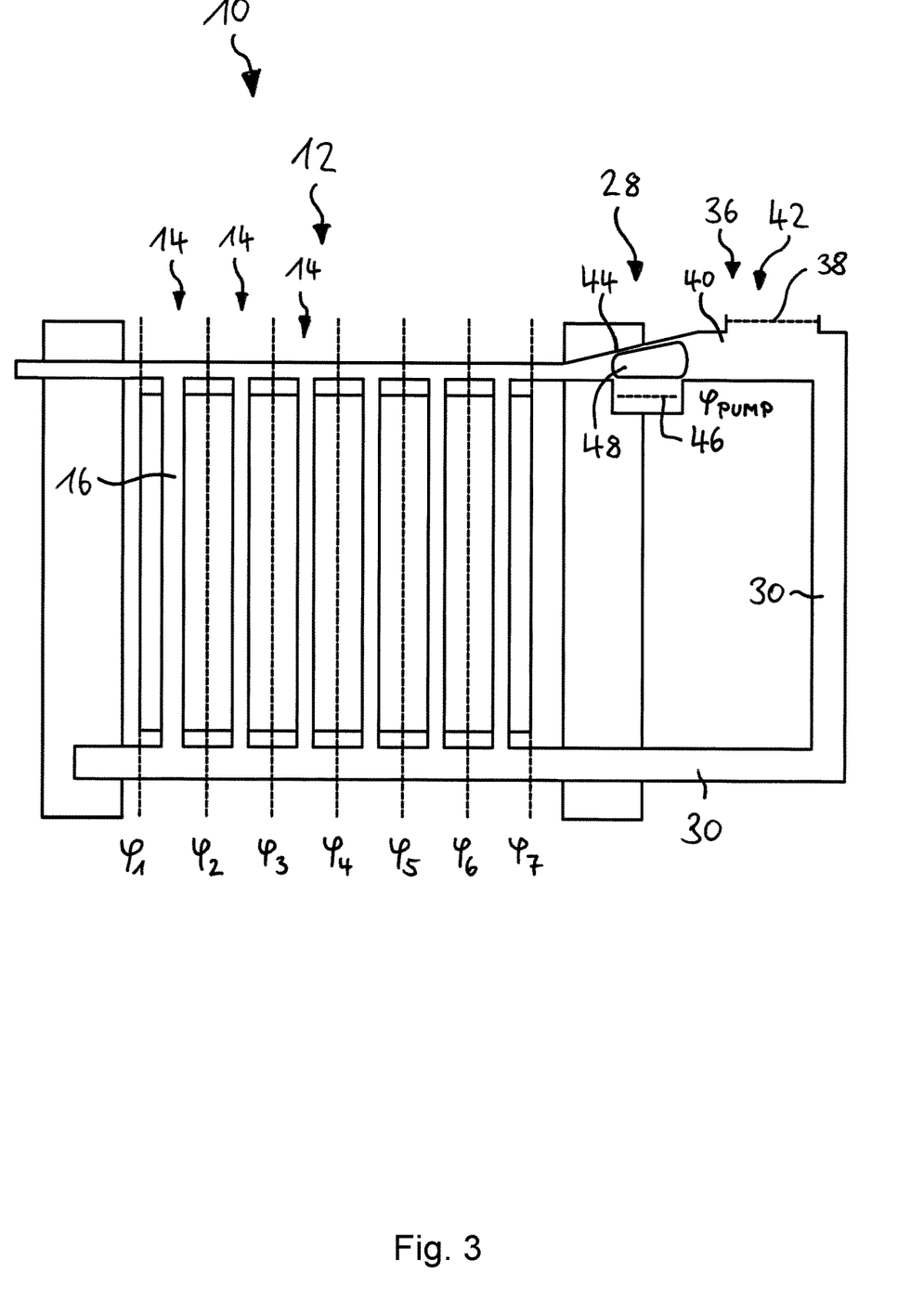
FIG. 3 shows a further exemplary embodiment of an electrolyzer system.
Figure 4:
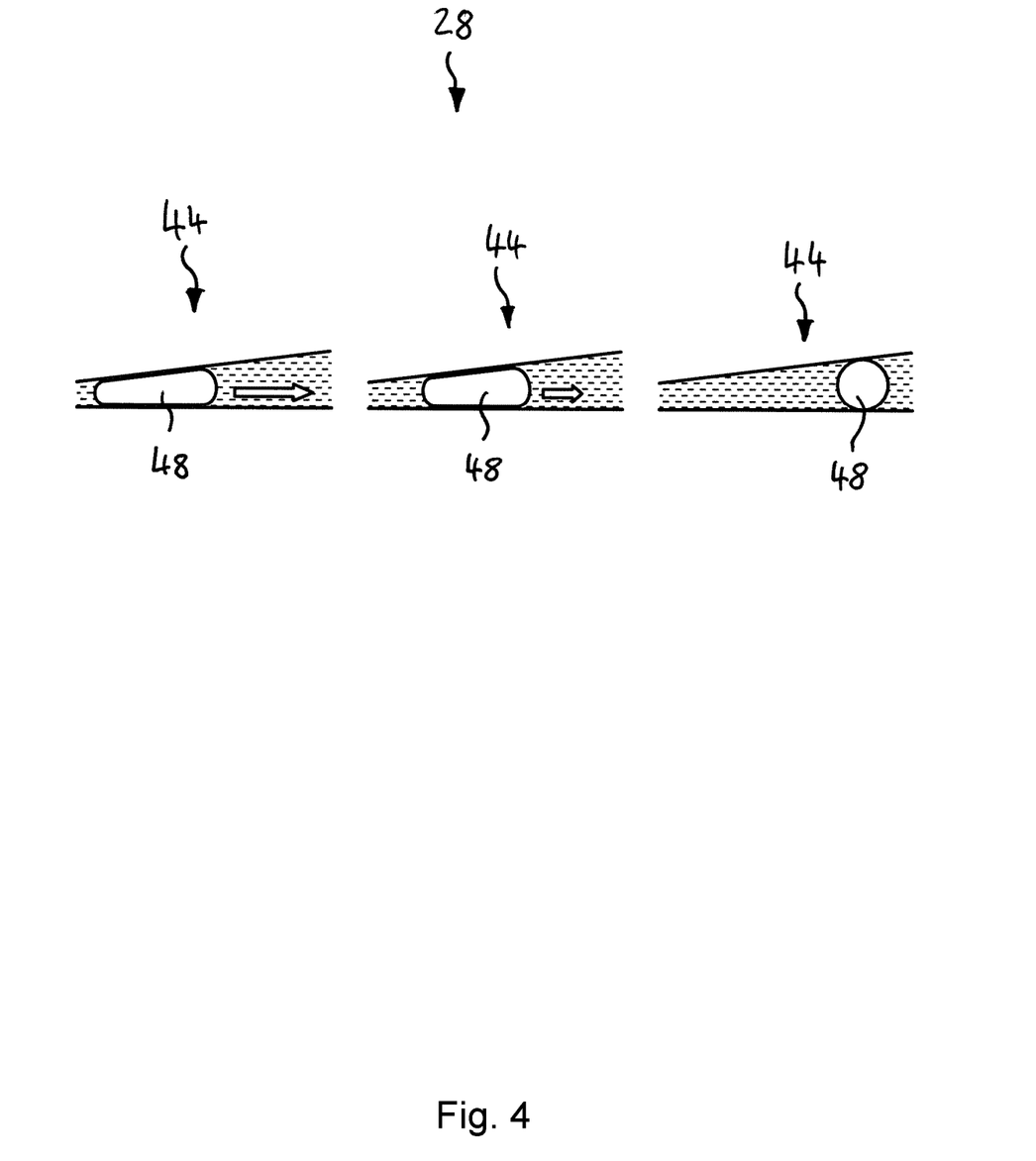
FIG. 4 shows a schematic representation of gas bubble conveyance.

Reference is made below to FIGS. 3 and 4, which show a further exemplary embodiment of the electrolyzer system 10. As represented in more detail in FIG. 3, the electrolysis device 12 comprises a plurality (presently six) of matrix cells 14. The matrix cells 14 are subjected to the electrical potentials $\varphi 1$ to $\varphi 7$ in order to carry out the electrolysis.

The pump device 28 conveys the electrolyte by means of gas bubbles. The pump device 28 has a capillary region 44 which expands in the fluid flow direction. Furthermore, adjacent to the capillary region 44, the pump device 28 comprises an electroactive surface 46, which can be subjected to an electrical potential $\varphi$pump relative to one of the potentials of the matrix cells 14. As a result, extraneous electrolysis takes place outside the matrix cells 14 and generates a gas bubble 48.

The principle is elucidated in more detail with reference to FIG. 4. As represented in FIG. 4, on the left, the gas bubble 48 in the capillary region 44 is accelerated in arrow direction owing to the different capillary pressure. The rate decreases further, as represented in FIG. 4, middle, because of the falling pressure difference. Finally, the gas bubble comes to rest (FIG. 4, right) when the gas bubble 48 has attained a spherical form and so has identical capillary pressures in front of and behind it.

At this point in time, however, the gas bubble 48 was moving, and will remain further in motion owing to the inertia of the liquid and to the continual formation of new gas bubbles 48. The gas bubble 48 entrains the electrolyte 60 over the entire pathway of the bubble, and so overall there is a transport of the electrolyte 60 from the narrower side to the wider side of the capillary region 44. In this way the electrolyte 60 can be conveyed in the electrolyte circuit 30 without moving parts.

Figure 5:
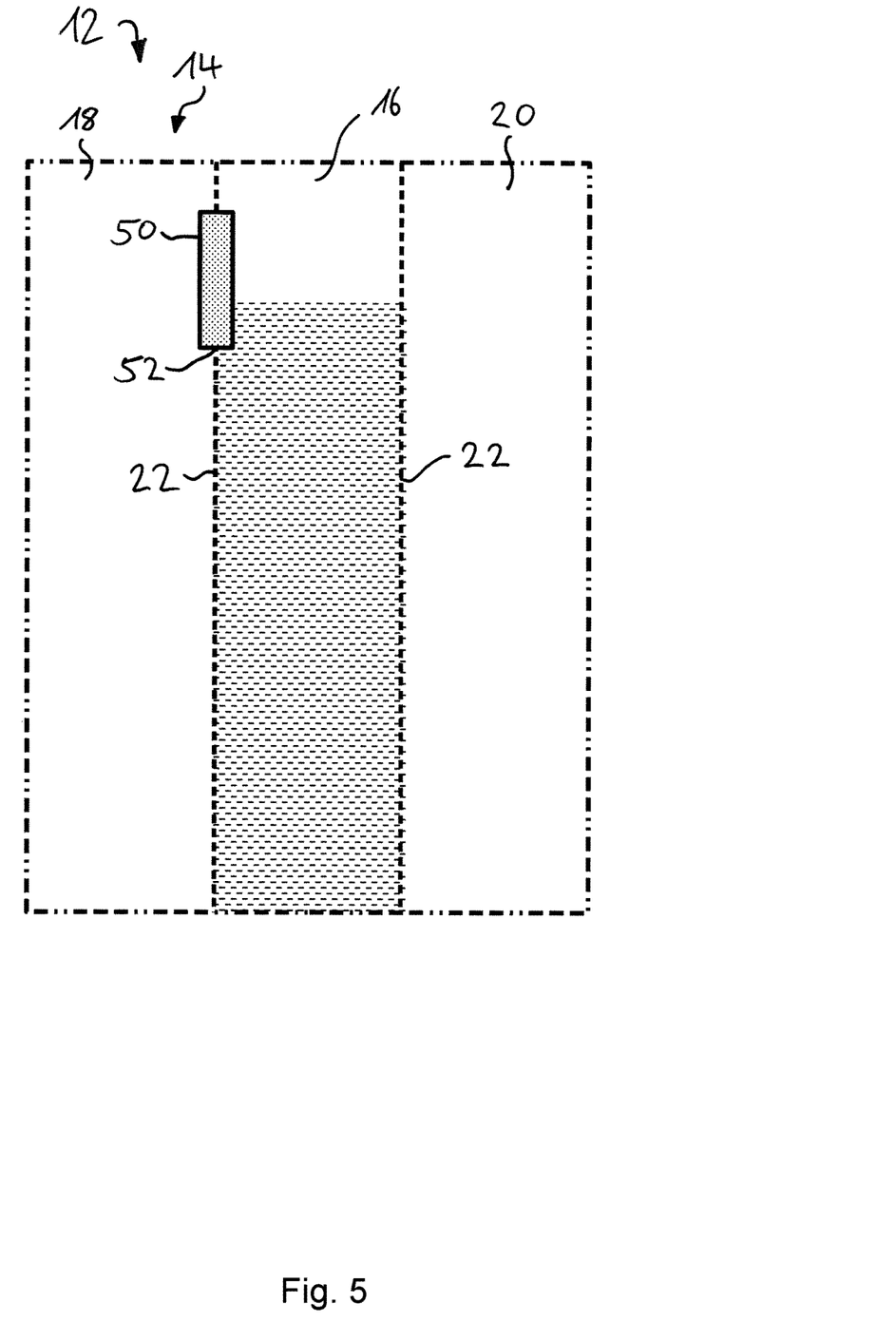
FIG. 5 shows an exemplary embodiment of a matrix cell for an electrolyzer system.
Figure 6:
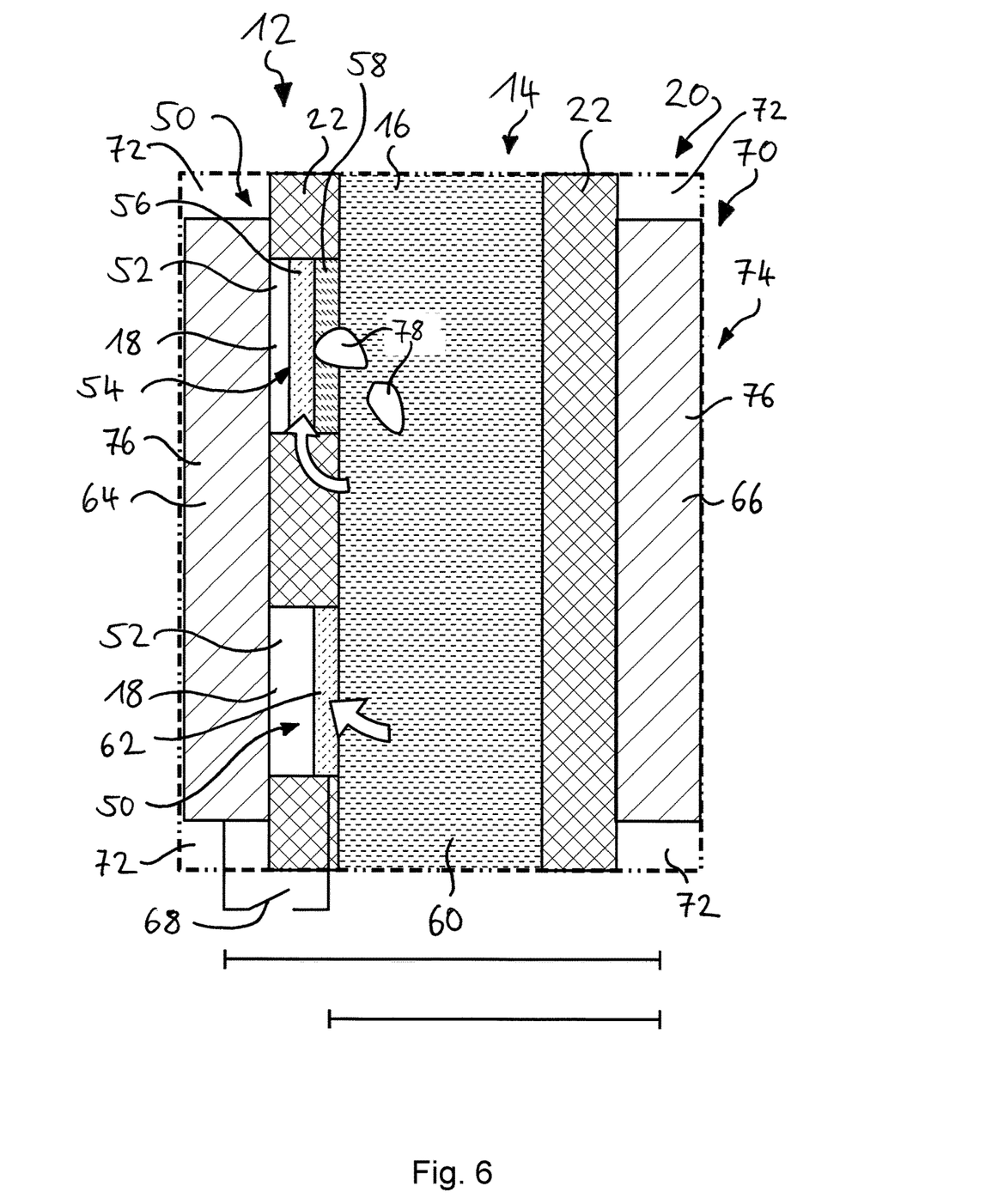
FIG. 6 shows a detailed representation of a degassing device of the matrix cell.

Reference is made below to FIGS. 5 and 6, which are used for more detailed elucidation of the construction of the matrix cell 14.

The matrix cell 14, as already described, comprises the electrolyte space 16, the cathodic gas space 18, the anodic gas space 20, and the membranes 22.

The matrix cell 14 further comprises a degassing device 50. The degassing device 50 is preferably disposed in a degassing aperture 52 formed in at least one of the membranes 22.

As represented in more detail in FIG. 5, the degassing device 50 may have a degassing layer structure 54. The degassing layer structure 54 comprises a hydrophilic degassing membrane 56 and a hydrophobic degassing membrane 58. The hydrophobic degassing membrane 58 is disposed between the electrolyte 60 and the hydrophilic degassing membrane 56. The hydrophilic degassing membrane 56 is wetted with the electrolyte 60 via the membrane 22.

The degassing device 50 further comprises a hydrophilic degassing membrane 62. The hydrophilic degassing membrane 62 may be, for example, a silver membrane. The hydrophilic degassing membrane 62 is disposed in the degassing aperture 52 and is in direct contact with the electrolyte 60 and also with the membrane 22.

The matrix cell 14 further comprises a cathode electrode 64 and an anode electrode 66. The cathode electrode 64 may be electrically connected to the hydrophilic degassing membrane 62 via a switch 68. The switch 68 may generally also be part of a control apparatus and may be controlled by means of software. The system involved may also be an integrated circuit or the like.

The matrix cell 14, moreover, may have an ultrasound generation device 70. The ultrasound generation device 70 is configured to convert electrical alternating voltage into ultrasound waves. The ultrasound generation device 70 comprises at least one ultrasonic transducer 72. The ultrasonic transducer 72 may be, for example, a piezoceramic. The ultrasonic transducer 72 is disposed, for example, adjacent to the electrodes 64 and 66 and aligned in such a way that the ultrasound waves are able to penetrate into the electrolyte space 16.

The matrix cell 14 may have a field generation device 74. The field generation device 74 is configured to generate an electrical, a magnetic or an electromagnetic field. The field generation device 74 comprises a plurality of field electrodes 76. The field electrode 76 may be disposed, for example, adjacent to the electrodes 64 and 66 or integrated in them.

The functioning of the matrix cell 14 is elucidated in more detail below with reference in particular to FIG. 6.

First of all, the cathode electrode 64 and the anode electrode 66 are subjected to electrical potentials phi 1 and phi 2. The potential difference is selected such that the electrolyte 60 can be electrolyzed at the interface between the respective electrode 64, 66 and the membrane 22. The product gas bubbles 78 generated by the electrolysis move from the interface to the gas space. Gas (predominantly product gas) which has entered the electrolyte space 16 unwantedly, as a result of extraneous electrolysis or other circumstances, for example, may be transported by means of the degassing layer structure 54 through the hydrophobic degassing membrane 58 and subsequently through the hydrophilic degassing membrane 56 and so enters the cathodic gas space 18.

If, for example, there is a risk of electrolyte deficiency in the electrolyte space 16 and the possibility, therefore, of an overvoltage between the electrodes 64 and 66, the hydrophilic degassing membrane 62 may be short-circuited with the cathode electrode 64. This changes the electrical potential of the hydrophilic degassing membrane 62, with the result that electrolysis now takes place within the hydrophilic degassing membrane 62 as well. Such electrolysis may also be brought about by a higher voltage between the electrodes 64 and 66. The gas bubbles generated in the hydrophilic degassing membrane 62 open the hydrophilic degassing membrane 62 and cause excess product gas to escape into the cathodic gas space 18.

The ultrasound generation device 70 may additionally emit ultrasound into the electrolyte space 16, in order to loosen any stuck product gas bubbles 78 or to cause relatively small product gas bubbles to unite to form fewer but larger product gas bubbles.

Because the electrolysis of the electrolyte 60 is accompanied by ionic movements, the field generation device 74 may be used to generate a flow of the electrolyte 60 within the matrix cell 14, from bottom to top, for example.

In order to improve the regeneration capacity of the electrolyzer system 10 it is proposed that matrix cells 14 are used. The electrolyte 60 is electrolyzed in the matrix cell 14. Gas (predominantly product gas) which has unwantedly accessed the electrolyte space 16 is transported off from the electrolyte space 16 into the gas space 18 envisioned therefor by a degassing device 50. Additional measures such as ultrasonic transducers 72 and field electrodes 76 may realize electrolyte flow and improved transporting-off of gas.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS 10 electrolyzer system
12 electrolyzer device
14 matrix cell
16 electrolyte space
18 cathodic gas space
20 anodic gas space
22 membrane
24 cathodic gas exit
26 anodic gas exit
28 pump device
30 electrolyte circuit
32 pressure regulation device
34 metering valve
35 further metering valve
36 separation device
37 cathodic gas separator
38 separation membrane
39 anodic gas separator
40 liquid side
42 gas side
44 capillary region
46 electroactive surface
48 gas bubble
50 degassing device
52 degassing aperture
54 degassing viewing structure
56 hydrophilic degassing membrane
58 hydrophobic degassing membrane
60 electrolyte
62 hydrophilic degassing membrane
64 cathode electrode
66 anode electrode
68 switch
70 ultrasound generation device
72 ultrasonic transducer
74 field generation device
76 field electrode
78 product gas bubble

The invention claimed is:

1. A matrix cell configured for an electrolyzer system for electrolyzing an aqueous electrolyte, wherein the matrix cell comprises:
an electrolyte space for accommodating the aqueous electrolyte;
a cathode electrode and an anode electrode;
a cathodic gas space, disposed adjacent to the electrolyte space and separated therefrom by a gastight first membrane, the cathodic gas space and the cathode electrode being configured such that energizing of the cathode electrode allows a cathodic product gas to be generated at an interface of the cathode electrode with the first membrane such that it is flowable into the cathodic gas space;
an anodic gas space, disposed adjacent to the electrolyte space and separated therefrom by a gastight second membrane, the anodic gas space and the anode electrode being configured such that energizing of the anode electrode allows anodic product gas to be generated at an interface of the anode electrode with the second membrane such that it is flowable into the anodic gas space; and
a degassing device bound between the electrolyte space and the anode electrode or the cathode electrode, which is configured to allow selective emergence of gas located in the electrolyte space into at least one of the cathodic gas space and the anodic gas space,
wherein the degassing device is disposed in a degassing aperture, formed in at least one membrane, in order to provide selective passage for at least one of the cathodic product gas or the anodic product gas from the electrolyte space into at least one of the cathodic gas space and the anodic gas space.

2. The matrix cell as claimed in claim 1, wherein the degassing device is disposed in a degassing aperture, formed in the first membrane, in order to provide passage for the cathodic product gas from the electrolyte space into the cathodic gas space.

3. The matrix cell as claimed in claim 1, wherein the degassing device has a degassing membrane which is configured selectively to let through predominantly the cathodic product gas or the anodic product gas.

4. The matrix cell as claimed in claim 1, wherein the degassing device comprises at least one degassing membrane layer structure which has a hydrophilic or hydrophobic degassing membrane.

5. The matrix cell as claimed in claim 1, wherein the degassing device comprises a degassing membrane layer structure which comprises a hydrophobic degassing membrane and a hydrophilic degassing membrane, the hydrophobic degassing membrane being disposed between the hydrophilic degassing membrane and the electrolyte space such that the hydrophobic degassing membrane in an operating state comes into contact with the electrolyte.

6. The matrix cell as claimed in claim 1, wherein the degassing device is configured to be brought into a state in which gas bubbles can be generated in a hydrophilic degassing membrane.

7. The matrix cell as claimed in claim 1, wherein the degassing device comprises at least one degassing membrane, wherein at least one of:
at least one degassing membrane is a porous membrane which is configured to transport product gas by means of pores,
at least one degassing membrane is a solution-diffusion membrane which is configured to transport product gas dissolved in the membrane by means of diffusion, or
at least one degassing membrane is a functional membrane which has a poreless configuration and is at least one of water- or ion-conducting.

8. The matrix cell as claimed in claim 1, wherein at least one of:

the electrolyte contains a devolatilizing additive which is configured to promote a coalescence of small gas bubbles into a larger gas bubble;

the electrolyte contains a viscosity-modifying additive which is configured to change a viscosity of the electrolyte in comparison to the viscosity of the electrolyte without such additive;

the electrolyte contains a defoaming additive which is configured to reduce a probability of the development of liquid interfaces, in order to facilitate gas transport;

the electrolyte contains a magnetorheological additive which is configured to heighten an interaction between the electrolyte and a magnetic field; or the electrolyte contains an electrorheological additive which is configured to heighten the interaction between the electrolyte and an electrical field.

9. The matrix cell as claimed in claim 1, further comprising a field generation device which is configured to generate at least one of an electrical field or a magnetic field configured such that a flow of the electrolyte in the electrolyte space in a fluid flow direction can be generated.

10. The matrix cell as claimed in claim 1, wherein the degassing device comprises a degassing membrane layer structure which comprises a hydrophobic degassing membrane, wherein the hydrophobic degassing membrane is a silver membrane.

11. The matrix cell as claimed in claim 1, wherein the degassing device comprises at least one degassing membrane, wherein the at least one degassing membrane is a functional membrane which has a poreless configuration and is at least one of water- or ion-conducting.

12. The matrix cell as claimed in claim 5, wherein the hydrophilic degassing membrane is a silver membrane.

13. An electrolyzer system configured for electrolyzing an aqueous electrolyte, wherein the electrolyzer system comprises:

an electrolyzer device having at least one matrix cell which has an electrolyte space for accommodating the aqueous electrolyte, the at least one matrix cell further comprising;

a cathode electrode and an anode electrode;

a cathodic gas space disposed adjacent to the electrolyte space and separated therefrom by a gastight first membrane, the cathodic gas space and the cathode electrode being configured such that energizing of the cathode electrode allows a cathodic product gas to be generated at an interface of the cathode electrode with the first membrane such that it is flowable into the cathodic gas space;

an anodic gas space disposed adjacent to the electrolyte space and separated therefrom by a gastight second membrane, the anodic gas space and the anode electrode being configured such that energizing of the anode electrode allows anodic product gas to be generated at an interface of the anode electrode with the second membrane such that it is flowable into the anodic gas space; and a degassing device bound between the electrolyte space and the anode electrode or the cathode electrode, which is configured to allow selective emergence of gas located in the electrolyte space into at least one of the cathodic gas space and the anodic gas space, wherein the degassing device is disposed in a degassing aperture, formed in at least one membrane, in order to provide selective passage for at least one of the cathodic product gas or the anodic product gas from the electrolyte space into at least one of the cathodic gas space and the anodic gas space;

wherein the electrolyzer system comprises at least one of the following features:

a) at least one separation device which is in fluid communication with the electrolyte space and a product gas exit and is configured to let product gas through from a liquid side to a gas side; or b) at least one pump device which is configured to convey the electrolyte in a circuit extending through the electrolyte space.

14. The electrolyzer system as claimed in claim 13, further comprising at least one pressure regulation device, which is connected in a fluid flux direction between one of the gas spaces and the separation device, wherein the at least one pressure regulation device is configured to limit a fluid flux from the gas space to the separation device such that a lower gas pressure prevails on the gas side.

15. The electrolyzer system as claimed in claim 13, wherein the at least one separation device comprises a cathodic gas separator which, on the gas side, is in fluid communication with the cathodic gas space and also with a cathodic product gas exit and, on the liquid side, is in fluid communication with the electrolyte space.

16. The electrolyzer system as claimed in claim 15, wherein the cathodic gas separator has a separation membrane which is configured to let cathodic product gas through from the liquid side to the gas side and wherein the at least one separation device further comprises an anodic gas separator which on a gas side thereof is in fluid communication with the anodic gas space and also with an anodic product gas exit and on the liquid side is in fluid communication with the liquid side of the cathodic gas separator.

17. The electrolyzer system as claimed in claim 13, wherein the at least one pump device is configured to convey the electrolyte by means of generation of a gas bubble, the at least one pump device comprising a capillary region which is configured to expand in a fluid flow direction in order to drive the gas bubble in the fluid flow direction, and there being disposed, bordering the capillary region, a pump electrode which can be subjected to electrical potential such that, in the capillary region, a gas bubble can be generated from the electrolyte.

* * * * *